United States Patent Office 3,014,027
Patented Dec. 19, 1961

3,014,027
N-ACYLAMINO COMPOUNDS
Jean Druey, Riehen, and Georg Huber, Allschwil, Switzerland, assignors to Ciba Pharmaceutical Products Inc., Summit, N.J.
No Drawing. Filed Jan. 14, 1957, Ser. No. 633,825
Claims priority, application Switzerland Jan. 20, 1956
19 Claims. (Cl. 260—211)

This invention relates to new N-heterocyclic acylamino compounds. More particularly the invention concerns N-heterocyclic acyl-amino-sugars, whose heterocyclic acyl-radical is the radical of a six-membered monocyclic, heterocyclic carboxylic acid containing at least one ring nitrogen atom. Such carboxylic acids are in particular pyridine carboxylic acids and pyridazine carboxylic acids, primarily nicotinic acid. The aminosugar radical is derived preferably from amino-hexoses, primarily from glucosamine, e.g. D-glucosamine. One or more hydroxyl groups of the sugar radical may be substituted, for example acylated e.g. acetylated; the invention, however, concerns chiefly O-unsubstituted N-heterocyclic acyl-amino-sugars.

The new compounds possess valuable pharmacological properties. They have a favourable influence in the case of pathological symptoms due to tubercle bacilli. They also have an inhibiting effect on amoeba. Accordingly, they can be used for combating diseases caused by tubercle bacilli on amoeba. Particularly useful is the N-nicotinoyl-D-glucosamine.

The O-substituted, e.g. acetylated compounds besides being pharmacologically active as indicated above and consequently being useful for combating diseases are valuable intermediates for the preparation of the corresponding O-unsubstituted compounds of the invention.

The new N-heterocyclic acyl-amino sugars are obtained by reacting the corresponding N-unsubstituted amino-sugar with a six-membered monocyclic, heterocyclic carboxylic acid containing at least one ring nitrogen atom, preferably in the form of its acylating derivatives, such as halides, e.g. the chloride, or the anhydride, and, if desired, splitting off any O-acyl groups present in the compound obtained and/or acylating free hydroxyl groups.

Accordingly, O-unsubstituted amino-sugars can be treated with the acylating agent and, if desired, any O-acyl groups present in the compounds obtained can be split off by hydrolysis or trans-esterification. It is however, for example, also possible to react O-acylated, as for example O-acylated amino-sugars with the acylating heterocyclic carboxylic acid or its derivatives and, if desired, to split off the O-acyl groups from the resulting N-heterocyclically acylated O-acyl-amino-sugars by means of hydrolyzing or trans-esterifying agents.

The acylation reaction is advantageously conducted in the presence of a condensing agent such as an inorganic or organic base. Particularly suitable are pyridine, a salt of the corresponding carboxylic acid or anhydrous potassium carbonate for use as basic condensing agent. Any O-acyl groups originally present or formed during the reaction can be split off under mild conditions and without disruption of the acylamino group, for example by treatment with alkaline agents such as ammoniacal alcohol, especially ammoniacal methanol. The subsequent acylation, such as acetylation, of free hydroxyl groups is carried out by the usual methods employed in sugar chemistry.

Those starting materials which are new can be prepared by methods analogous to those used for the preparation of the known starting materials.

The new compounds can be used as medicaments in the form of pharmaceutical preparations which contain them or their salts in admixture with a pharmaceutical organic or inorganic, solid or liquid carrier material suitable for enteral, parenteral or local application. For the production of the preparations such substances are concerned as do not react with the new compounds, for example water, gelatine, lactose, starch, magnesium stearate, talc, vegetable oils, benzyl alcohols, gums, polyalkylene glycols, petroleum jelly, cholesterol or other known medicament carriers. The pharmaceutical preparations can exist, for example, in the form of tablets, dragees, salves, creams or in liquid form as solutions, suspensions or emulsions. If desired they are sterilized and/or contain auxiliary substances such as preserving, stabilizing, wetting or emulsifying agents, salts for variation of the osmotic pressure or buffer substances. They can also contain other therapeutically valuable materials. The preparations are produced by customary methods.

The following examples illustrate the invention:

Example 1

3.47 grams of 1:3:4:6-tetraacetyl-$\beta$-D-glucosamine, 4.56 grams of nicotinic acid anhydride and 1.7 grams of the potassium salt of nicotinic acid are heated in 50 cc. of dioxane for two hours on a boiling water bath. The solvent is thereupon removed under vacuum. The residue is taken up in 150 cc. of chloroform and the chloroform solution washed with sodium bicarbonate solution and water, dried with sodium sulfate, filtered and evaporated under vacuum. The residue is crystallized from alcohol and 4.5 grams obtained of N-nicotinoyl-1:3:4:6:-tetraacetyl-$\beta$-D-glucosamine of M.P. 211–213° C. After triple recrystallization the melting point rises to 213–214° C.; $[\alpha]_D^{22}$ +40°±4° (in chloroform).

1 gram of N-nicotinoyl-1:3:4:6-tetraacetyl-$\beta$-D-glucosamine is dissolved in 25 cc. of absolute methanol and with ice cooling 25 cc. of methanol saturated with ammonia at 0° C. added. After 7 hours' standing at room temperature, the solvent is removed under vacuum. The residue is recrystallized from water-alcohol and 0.55 gram is obtained of N-nicotinoyl-D-glucosamine of M.P. 217–220° C.; $[\alpha]_D^{22}$ +42°±4° (in water after about 3 minutes).

Example 2

3.47 grams of 1:3:4:6-tetraacetyl-$\beta$-D-glucosamine are dissolved in 50 cc. of dimethyl formamide and 25 cc. of pyridine, then with ice cooling 4.56 grams of isonicotinic acid anhydride are added and the mixture maintained for 2 hours at 0° C. and 24 hours at room temperature. Thereupon, the solution is poured into ice water and extracted with 250 cc. of chloroform divided into portions. The chloroform extracts are dried with sodium sulfate, filtered and evaporated under vacuum. The residue is crystallized from alcohol and 4 grams obtained of N-isonicotinoyl - 1:3:4:6-tetraacetyl-$\beta$-D-glucosamine of M.P. 204–205° C. After triple recrystallization from alcohol, the melting point rises to 217° C.; $[\alpha]_D^{22}$ +34°±4° (in chloroform).

2.1 grams of N-isonicotinoyl-1:3:4:6-tetraacetyl-$\beta$-D-glucosamine are dissolved in 25 cc. of absolute methanol and with ice cooling 25 cc. of methanol saturated with ammonia at 0° C. added. After 7 hours' standing at room temperature, the solvent is removed under vacuum. The residue is crystallized from water-alcohol and 0.95 gram obtained of N-isonicotinoyl-D-glucosamine of M.P. 200–202° C. After two further recrystallizations from water-alcohol, the melting point rises to 210–212° C.

Example 3

1.79 grams of D-glucosamine in 25 cc. of dimethyl formamide and 10 cc. of pyridine are mixed, while being cooled with ice, with 4.56 grams of nicotinic acid anhydride. The reaction mixture is kept at room temperature for 24 hours and shaken from time to time. It is then evaporated to dryness under reduced pressure, the residue mixed with 50 cc. of absolute methanol and 25 cc. of methanol saturated with ammonia, then kept at room temperature for 4 hours, and evaporated in vacuo. Crystallization of the residue from a mixture of water and alcohol yields the N-nicotinoyl-D-glucosamine described in Example 1.

*Example 4*

1.79 grams of D-glucosamine in 50 cc. of absolute methanol are mixed with 4.56 grams of nicotinic acid anhydride while stirring vigorously. After 4 hours' stirring the mixture is mixed with 25 cc. of methanol saturated with ammonia, and allowed to stand at room temperature for 4 hours. The reaction mixture is then evaporated to dryness and the residue crystallized from a mixture of water and alcohol. There is obtained the N-nicotinoyl-D-glucosamine of melting point 217–220° C. described in Example 1.

*Example 5*

4.62 grams of 1-methyl-3-carboxy-6-oxo-1,6-dihydropyridazine in 20 cc. of absolute benzene are boiled under reflux for 6 hours with 15 cc. of thionyl chloride. The mixture is then evaporated to dryness and there are added to the crystalline residue 5.37 grams of D-glucosamine in 50 cc. of dimethyl formamide and 25 cc. of pyridine while cooling with ice. The reaction mixture is kept at room temperature for 24 hours and shaken from time to time. After that it is evaporated to dryness. The residue is mixed with 100 cc. of absolute methanol and 50 cc. of methanol saturated with ammonia, and then kept at room temperature for 4 hours. The reaction mixture is then evaporated under reduced pressure and the residue crystallized from methanol. There is obtained N-(1-methyl-6-oxo-1,6-dihydropyridazyl-(3)-carbonyl)-D-glucosamine of melting point 186–187° C.

What is claimed is:
1. N-heterocyclic acyl-amino sugars the acyl radical of which is derived from a six-membered monocyclic, aza-carbo cyclic carboxylic acid.
2. N-heterocyclic acyl-amino sugars the acyl radical of which is derived from a six-membered monocyclic aza-carbocyclic carboxylic acid and in which at least part of the hydroxyl groups are acylated with a monobasic carboxylic acid.
3. N-heterocyclic acyl-amino sugars the acyl radical of which is derived from a six-membered monocyclic, aza-carbocyclic carboxylic acid and in which the hydroxyl groups are unsubstituted.
4. N-heterocyclic acyl-amino sugars the acyl radical of which is derived from a six-membered monocyclic, aza-carbocyclic carboxylic acid and in which at least part of the hydroxyl groups are acetylated.
5. N-heterocyclic acyl-amino sugars the acyl radical of which is derived from pyridine carboxylic acids.
6. N-heterocyclic acyl-amino sugars the acyl radical of which is derived from pyridazine carboxylic acids.
7. N-heterocyclic acyl-amino sugars the acyl radical of which is a pyridoyl radical and in which the hydroxyl groups are unsubstituted.
8. N-heterocyclic acyl-amino sugars the acyl radical of which is a pyridoyl radical and in which the hydroxyl groups are acetylated.
9. N-heterocyclic acyl-amino sugars the acyl radical of which is a pyridazayl radical and in which the hydroxyl groups are unsubstituted.
10. N-heterocyclic acyl-amino sugars the acyl radical of which is a pyridazoyl radical and in which at least part of the hydroxyl groups are acetylated.
11. N-isonicotinoyl-amino-hexoses.
12. N-nicotinoyl-amino-hexoses.
13. N-isonicotinoyl-tetraacetyl-amino-hexoses.
14. N-nicotinoyl-tetraacetyl-amino-hexoses.
15. N-nicotinoyl-D-glucosamine.
16. N-isonicotinoyl-D-glucosamine.
17. N-isonicotinoyl-1:3:4:6-tetraacyl-β-D-glucosamine.
18. N-nicotinoyl-1:3:4:6-tetraacetyl-β-D-glucosamine.
19. N - [1 - methyl-6-oxo-1:6-dihydro-pyridazyl-(3)-carbonyl]-β-D-glucosamine.

References Cited in the file of this patent
UNITED STATES PATENTS

| | | |
|---|---|---|
| 2,233,419 | Moore | Mar. 4, 1941 |
| 2,726,983 | Yale et al. | Dec. 13, 1955 |
| 2,802,819 | Lederer et al. | Aug. 13, 1957 |

OTHER REFERENCES

Kushner et al.: Journal of Organic Chem. 13 (1948), 834–6.